July 2, 1957     H. KAHN     2,797,469
METALIZED GLASS FIBERS AND PRODUCTS THEREOF
Filed Jan. 24, 1955
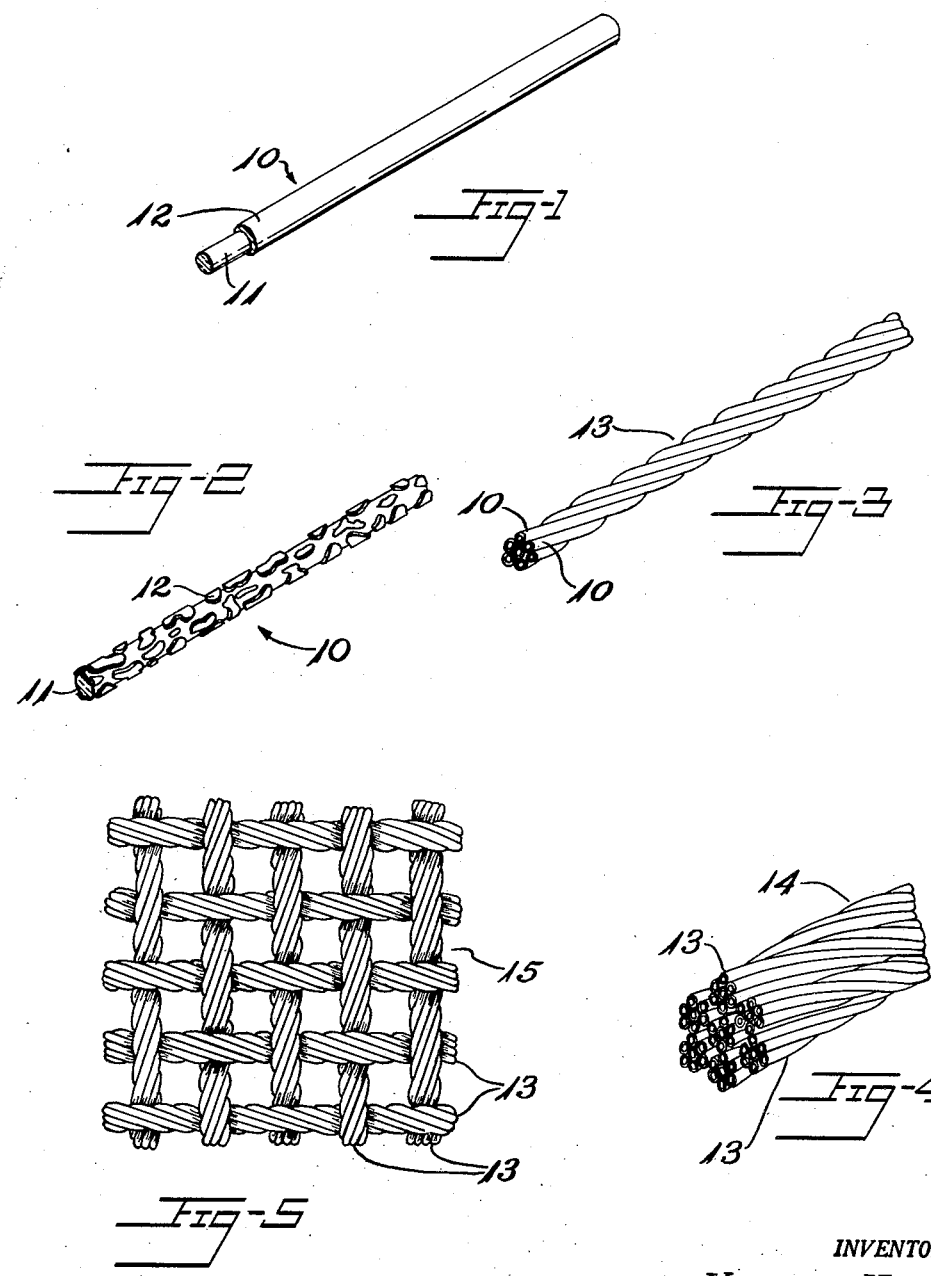
INVENTOR.
HENRY KAHN
BY
ATTY.

2,797,469
METALIZED GLASS FIBERS AND PRODUCTS THEREOF

Henry Kahn, Cuyahoga Falls, Ohio, assignor to The B. F. Goodrich Company, New York, N. Y., a corporation of New York Application January 24, 1955, Serial No. 483,486

19 Claims. (Cl. 28—80)

This invention relates to coated glass fibers and pertains more particularly to flexible metalized glass fibers and products thereof.

Glass fibers have been successfully substituted for cotton and wool fibers in a variety of manufactured products. For many applications the substitution of glass fibers for cotton and wool fibers has been quite satisfactory, mainly because of the extremely high tensile strength of the glass fibers and the excellent resistance of most glasses to chemical attack and heat degradation. The most serious objection to the use of glass fibers is the poor durability of a glass fiber when flexed or worked in contact with other glass fibers. Apparently, this fragility of the fibers is associated with the high coefficient of friction of glass on glass. Efforts to reduce the coefficient of friction between adjacent glass fibers of a structure by coating the individual glass fibers with a lubricating material have met with varying degrees of success.

It was discovered that glass fibers coated with a metal coating are not subject to the limitations of uncoated glass fibers, and that glass fiber materials formed of the metalized glass fibers will maintain their full strength and other desirable properties without essential change over long periods of wear even when the materials are flexed or worked. The application of the metal coating to the glass fiber preferably is carried out by advancing the glass fiber through molten metal, a thin coating of the metal adhering to the surface of the glass fiber when the fiber is withdrawn from the molten metal.

It has been observed, however, that molten pure lead does not deposit a smooth coating of the metal on the surface of a glass fiber formed of a glass composition having a low soda-ash content, but instead the coating consists of small globules or beads of the metal. Apparently, molten pure lead does not "wet" the surface of a low soda-ash glass sufficiently to allow a smooth coating to be deposited thereon. Furthermore, the adhesion of the beaded coating of pure lead to glass fibers of low soda-ash glass is insufficient to enable the coated fibers to be used satisfactorily for some applications for which glass fibers are particularly useful.

I have found a group of lead alloys which readily "wet" the surface of low soda-ash glasses. The metal coatings of this invention, described hereinafter, adhere much more tenaciously to the glass fiber than does pure lead. As a result of this invention low soda-ash glass fibers may be metalized with coatings which have all of the advantages of pure lead coatings without any of the disadvantages experienced when coating such glass fibers with pure lead.

In accordance with this invention glass fibers are produced in one of the well-known ways and are coated with a metal alloy comprising lead and at least one metal having a free energy of formation of the oxide of the metal (the term "oxide of the metal" as used being intended to mean oxides of the metal in those instances where more than one oxide of the metal can be formed) measured at 500° C. below —40 kilocalories per atom of oxygen selected from the group of metals consisting of sodium, potassium, magnesium, calcium, zinc, strontium, barium, aluminum, gallium, titanium, tin, chromium, manganese, cadmium, and iron. Of the above-named group of metals, the use in this invention of the metals zinc, aluminum, titanium, sodium and cadmium offer advantages in addition to those provided by the other metals of the group and, consequently, these five metals are preferred for use in this invention. Although the amount of the alloying metals sodium, potassium, magnesium, calcium, zinc, strontium, barium, aluminum, gallium, titanium, tin, chromium, manganese, cadmium and iron in the coating metal may vary over a wide range, preferably a total of .001 to 10 percent by weight of these metals is used in the metal coating composition, a total of .001 to 5 percent by weight being even more preferred. In addition to lead and the above-named alloying metals, the metal coating composition may contain other metals which can be alloyed with lead.

The glass fibers which may be used in this invention are any of the commercially available glass fiber materials although, as stated heretofore, this invention has particular application to metalized glass fibers formed of a low soda-ash glass. Accordingly, the glass fibers may be formed from glass of various compositions containing silica with or without such glass-forming acids as boric acid and phosphoric acid, combined with such metal oxides as lime, baryta, lead oxide, zinc oxide, copper oxide, manganese oxide and iron oxide, and other well-known glass-forming constituents.

The glass fibers to which the metal coating of this invention is applied should be of sufficiently small diameter to be of high strength and flexibility. While glass fibers up to about 0.01 inch may be used for some purposes, best results are obtained when very much finer glass fibers are used, glass fibers having a diameter of the order of 0.001 to 0.0001 inch being preferred, since the finer fibers by virtue of their small diameter are extremely flexible. The glass fiber used in this invention may be prepared in the form of relatively short lengths (staple fiber) or in the form of continuous filaments. It will be understood that the term "fiber" when used in this specification is intended to include both continuous filaments and staple fibers. Preferably continuous glass filaments are employed when practicing this invention, since uniform application of the metal coating is thereby facilitated.

The metal coating of this invention may vary in dimension from the smallest thickness that can be deposited on the glass fiber up to as much as 0.01 inch or more in some instances, although a thickness of about 0.000005 to 0.0005 inch is now considered to be adequate. The metal coating may be applied to the glass fiber by any procedure capable of depositing the desired quantity of metal onto the surface of the glass fiber, but the procedure now preferred is to coat the glass fiber by drawing a continuous glass filament through a small mass of molten coating metal.

The properties of the metalized glass fibers of this invention are further enhanced by providing a secondary coating over the metal coating, the secondary coating being intended to facilitate relative motion between the metalized glass fiber surfaces. Accordingly, the secondary coating should be a material capable of functioning as a lubricant for the metal and may be either a friction-reducing non-metallic material or a surface layer produced by a conversion of the surface of the metal coating to another compound. For example, the secondary coating may be composed of any oily or waxy material such as the high molecular weight hydrocarbons, alcohols, esters, organo-siloxanes or the like, or such inorganic materials as metal sulfides or chlorides and the like, or a metal soap, or even a different metal.

To facilitate the teaching of this invention, reference will be made, henceforth, to the specific embodiments hereinafter described. However, it will be understood that I do not intend to limit the scope of this invention to these specific embodiments since they are intended merely as illustrations of this invention.

The invention is illustrated in the accompanying drawing in which:

Fig. 1 is an enlarged perspective view partly broken away and in section of a glass fiber embodying this invention;

Fig. 2 is an enlarged perspective view of a second embodiment of this invention;

Fig. 3 is an enlarged perspective view of a glass fiber yarn embodying this invention;

Fig. 4 is an enlarged perspective view of a glass fiber cord embodying this invention; and Fig. 5 is an enlarged plan view of a cloth woven from glass fiber yarn embodying this invention.

Referring to the drawings; fiber 10 comprises a glass fiber base member 11 having a small diameter within the range mentioned above. In accordance with this invention a coating or deposit 12 of an alloy comprising lead and at least one metal having a free energy of formation of the oxide of the metal measured at 500° C. below —40 kilocalories per atom of oxygen selected from the group consisting of sodium, potassium, magnesium, calcium, zinc, strontium, barium, aluminum, gallium, titanium, tin, chromium, manganese, cadmium and iron is disposed in direct adherent relationship over the circumferential face of base member 11. As shown in Fig. 1, coating 12 may be a continuous deposit or, as shown in Fig. 2, may consist of a discontinuous or interrupted coating. The metal-coated fibers of this invention may be twisted together in the usual manner to form a yarn 13, as shown in Fig. 3, and a number of such yarns 13 may be plied together to produce a cable cord 14, as shown in Fig. 4. Either yarns or cords so prepared may be fabricated into cloth such as the simple square-woven cloth 15 shown in Fig. 5, utilizing any of the textile fabricating techniques.

This invention is clearly illustrated by the following examples.

*Example I*

0.0004 inch diameter glass filaments formed of a low soda-ash glass were coated with a lead-zinc alloy containing 1 percent by weight zinc by drawing the filaments individually through a molten bead of the lead-zinc alloy at a rate of 5000 feet/min. and permitting the metal film deposited on each filament as the filaments are withdrawn from the molten metal to solidify. Two hundred four lead-zinc alloy coated filaments so prepared were twisted together to form a two hundred four filament yarn. The yarn exhibits extraordinary resistance to wear and flexure. A quantitative measure of resistance to flexure failure was obtained by repeated flexing of the yarn through an arc of 150° at a constant rate in comparison with a similar yarn made from the same glass filaments, but without any coating. The uncoated glass filament yarn broke after about five minutes flexure, whereas the lead-zinc alloy coated glass filament yarn did not fail or exhibit any apparent wear after being flexed for over 27,320 minutes.

*Example II*

0.0004 inch diameter glass filaments formed of a low soda-ash glass were coated with a lead-iron alloy containing 0.01 percent by weight iron in the manner described above. Two hundred four of the coated filaments were twisted together to form a yarn, and the yarn was flexed in the manner described in Example I to determine its resistance to flexure failure. The yarn exhibited a life span before failure of over 1200 times that of a similar yarn formed of the same glass filaments but which were uncoated.

*Example III*

0.0004 inch diameter glass filaments formed of a low soda-ash glass were coated with a lead-tin alloy containing 2 percent by weight tin by drawing the filaments through the molten alloy as described in Example I. Two hundred four of the coated glass filaments were twisted into a yarn as in Example I. The yarn was flexed as described above to measure the resistance of the yarn to flexure failure. The yarn did not fail or exhibit any apparent wear after being flexed for over 1270 minutes. A similar yarn formed of the same glass filaments, but which were uncoated, failed after being flexed about 5 minutes.

*Example IV*

0.0004 inch diameter glass filaments formed of a low soda-ash glass were coated with a lead-sodium alloy containing 1 percent by weight sodium in the manner described in Example I. Two hundred four of the coated filaments were plied together as described heretofore to form a yarn, and the yarn was flexed in the manner described above to determine the flexure resistance of the yarn. The yarn had a life span before failure of over 980 times that of a similar yarn of the same glass filaments but which were uncoated.

*Example V*

0.0004 inch diameter glass filaments formed of a low soda-ash glass were coated with a lead-magnesium alloy containing 0.1 percent by weight magnesium by advancing the filaments through the molten alloy in the manner described above. Two hundred four of the coated glass filaments were formed into a yarn as described heretofore, and were flexed at a constant rate through an arc of 150. Here again the coated filament yarn was greatly superior in its resistance to failure on flexure than a similar yarn of uncoated filaments.

*Example VI*

0.0004 inch diameter glass filaments formed of a low soda-ash glass were coated with a lead-aluminum alloy containing 0.5 percent by weight aluminum in the manner described above. Seventy-two lead-aluminum alloy coated filaments so prepared were twisted together to form a seventy-two filament yarn. The yarn was flexed as described in Example I to determine its resistance to failure on flexure. The yarn was vastly superior in its resistance to failure on flexure as compared to a similar yarn of uncoated filaments.

All of the lead alloys described in the above examples readily "wet" the glass of the filaments and the coatings formed on the filaments adhere tenaciously to the glass surface of the filaments. Efforts to remove the coatings from the glass fibers by mechanical methods resulted in damage to the glass fibers.

Since the coated glass fibers of this invention are extremely strong and resistant to change, do not readily absorb moisture, do not shrink and are not susceptible to mildew deterioration and since a yarn formed thereof has exceptional resistance to failure on flexure, yarns formed thereof may be formed into cloth or into cord, the cloth or cord being particularly useful as a reinforcing material for articles subjected to severe flexure such as tires or conveyor and transmission belts. Indeed, the glass fiber materials of this invention may be fabricated into practically any of the products made from textile materials and particularly those required to resist mechanical strain and stress or chemical influences or attack by weather or vermin.

The coated glass fiber textile materials of this invention may be decorated by dyeing or printing the surface or by employing techniques leading to formation of textile products with any desired woven or knitted pattern. The textile products may be impregnated or coated with any desired flexible material and may be fabricated into composite products, other than those mentioned above, with a binder of rubber, flexible plastic, rigid plastic, or the like. either with or without an intermediate adhesive material to bond the coated glass fiber textile material to the matrix.

While I have disclosed herein a few specific embodiments of this invention, it is clear that obvious variations and modifications of this invention may be made without departing from the spirit and scope of the invention as defined in the appended claims.

I claim:

1. A flexible fiber comprising a glass base member and a metal coating of an alloy comprising lead and a metal having a free energy of formation of the oxide of the metal measured at 500° C. below —40 kilocalories per atom of oxygen selected from the group consisting of sodium, potassium, magnesium, calcium, zinc, strontium, barium, aluminum, gallium, titanium, tin, chromium, manganese, cadmium and iron, said metal coating disposed in direct adherent relationship over the circumferential face of said glass base member.

2. A flexible fiber comprising a glass base member and an uninterrupted metal coating of an alloy comprising lead and a metal having a free energy of formation of the oxide of the metal measured at 500° C. below —40 kilocalories per atom of oxygen selected from the group consisting of sodium, potassium, magnesium, calcium, zinc, strontium, barium, aluminum, gallium, titanium, tin, chromium, manganese, cadium and iron, said metal coating disposed in direct adherent relationship over the circumferential face of said glass base member.

3. A flexible fiber comprising a glass base member and a metal coating of an alloy comprising lead and .001 to 10 percent by weight of a metal having a free energy of formation of the oxide of the metal measured at 500° C. below —40 kilocalories per atom of oxygen selected from the group consisting of sodium, potassium, magnesium, calcium, zinc, strontium, barium, aluminum, gallium, titanium, tin, chromium, manganese, cadmium and iron, said metal coating disposed in direct adherent relationship over the circumferental face of sad glass base member.

4. A flexible fiber comprising a glass base member and a metal coating of an alloy comprising lead and .001 to 5 percent by weight of a metal having a free energy of formation of the oxide of the metal measured at 500° C. below —40 kilocalories per atom of oxygen selected from the group consisting of sodium, potassium, magnesium, calcium, zinc, strontium, barium, aluminum, gallium, titanium, tin, chromium, manganese, cadmium and iron, said metal coating disposed in direct adherent relationship over the circumferential face of said glass base member.

5. A flexible fiber comprising a glass base member and a metal coating of an alloy comprising lead and zinc disposed in direct adherent relationship over the circumferential face of said base member.

6. A flexible fiber comprising a glass base member and a metal coating of an alloy comprising lead and aluminum disposed in direct adherent relationship over the circumferential face of said base member.

7. A flexible fiber comprising a glass base member and a metal coating of an alloy comprising lead and titanium disposed in direct adherent relationship over the circumferential face of said base member.

8. A flexible fiber comprising a glass base member and a metal coating of an alloy comprising lead and sodium disposed in direct adherent relationship over the circumferential face of said base member.

9. A flexible fiber comprising a glass base member and a metal coating of an alloy comprising lead and cadmium disposed in direct adherent relationship over the circumferential face of said base member.

10. A flexible yarn comprising flexible glass fibers individually coated with a metal alloy comprising lead and a metal having a free energy of formation of the oxide of the metal measured at 500° C. below —40 kilocalories per atom of oxygen selected from the group consisting of sodium, potassium, magnesium, calcium, zinc, strontium, barium, aluminum, gallium, titanium, tin, chromium, manganese, cadmium and iron, the metal coating disposed over an individual glass fiber of said yarn being in direct adherent relationship with said glass fiber and maintaining said glass fiber essentially free from glass-to-glass contact with adjacent glass fibers of said yarn.

11. A flexible yarn comprising flexible glass fibers individually coated with a metal alloy comprising lead and .001 to 10 percent by weight of a metal having a free energy of formation of the oxide of the metal measured at 500° C. below —40 kilocalories per atom of oxygen selected from the group consisting of sodium, potassium, magnesium, calcium, zinc, strontium, barium, aluminum, gallium, titanium, tin, chromium, manganese, cadmium and iron, the metal coating disposed over an individual glass fiber of said yarn being in direct adherent relationship with said glass fiber and maintaining said glass fiber essentially free from glass-to-glass contact with adjacent glass fibers of said yarn.

12. A flexible yarn comprising flexible glass fibers individually coated with a metal alloy comprising lead and zinc, the metal coating disposed over an individual glass fiber of said yarn being in direct adherent relationship with said glass fiber and maintaining said glass fiber essentially free from glass-to-glass contact with adjacent glass fibers of said yarn.

13. A flexible yarn comprising flexible glass fibers individually coated with a metal alloy comprising lead and aluminum, the metal coating disposed over an individual glass fiber of said yarn being in direct adherent relationship with said glass fiber and maintaining said glass fiber essentially free from glass-to-glass contact with adjacent glass fibers of said yarn.

14. A flexible yarn comprising flexible glass fibers individually coated with a metal alloy comprising lead and titanium the metal coating disposed over an individual glass fiber of said yarn being in direct adherent relationship with said gass filber and maintaining said glass fiber essentially free from glass-to-glass contact with adjacent glass fibers of said yarn.

15. A flexible yarn comprising flexible glass fibers individually coated with a metal alloy comprising lead and sodium, the metal coating disposed over an individual glass fiber of said yarn being in direct adherent relationship with said glass fiber and maintaining said glass fiber essentially free from glass-to-glass contact with adjacent glass fibers of said yarn.

16. A flexible yarn comprising flexible glass fibers individually coated with a metal alloy comprising lead and cadmium, the metal coating disposed over an individual glass fiber of said yarn being in direct adherent relationship with said glass fiber and maintaining said glass fiber essentially free from glass-to-glass contact with adjacent glass fibers of said yarn.

17. A textile material comprising flexible yarn, said yarn comprising flexible glass fibers individually coated with a metal alloy comprising lead and a metal having a free energy of formation of the oxide of the metal measured at 500° C. below —40 kilocalories per atom of oxygen selected from the group consisting of sodium, potassium, magnesium, calcium, zinc, strontium, barium, aluminum, gallium, titanium, tin, chromium, manganese, cadmium and iron, the metal coating disposed over an individual glass fiber of said yarn being in direct adherent relationship with said glass fiber and maintaining said glass fiber essentially free from glass-to-glass contact with adjacent glass fibers of said yarn.

18. A woven cloth comprising flexible yarn, said yarn comprising flexible glass fibers individually coated with a metal alloy comprising lead and a metal having a free energy of formation of the oxide of the metal measured at 500° C. below −40 kilocalories per atom of oxygen selected from the group consisting of sodium, potassium, magnesium, calcium, zinc, strontium, barium, aluminum, gallium, titanium, tin, chromium, manganese, cadmium and iron, the metal coating disposed over an individual glass fiber of said yarn being in direct adherent relationship with said glass fiber and maintaining said glass fiber essentially free from glass-to-glass contact with adjacent glass fibers of said yarn.

19. A cord comprising flexible yarn, said yarn comprising flexible glass fibers individually coated with a metal alloy comprising lead and a metal having a free energy of formation of the oxide of the metal measured at 500° C. below −40 kilocalories per atom of oxygen selected from the group consisting of sodium, potassium, magnesium, calcium, zinc, strontium, barium, aluminum, gallium, titanium, tin, chromium, manganese, cadmium and iron, the metal coating disposed over an individual glass fiber of said yarn being in direct adherent relationship with said glass fiber and maintaining said glass fiber essentially free from glass-to-glass contact with adjacent glass fibers of said yarn.

References Cited in the file of this patent

UNITED STATES PATENTS

| | | |
|---|---|---|
| 2,699,415 | Nachtman | Jan. 11, 1955 |
| 2,720,076 | Sachara | Oct. 11, 1955 |